F. H. DUKESMITH.
FLUID PRESSURE BRAKE.
APPLICATION FILED FEB. 11, 1918.

1,357,692.

Patented Nov. 2, 1920.
3 SHEETS—SHEET 2.

Inventor,
Frank H. Dukesmith
by Geyer & Popp
Attorneys.

UNITED STATES PATENT OFFICE.

FRANK H. DUKESMITH, OF BUFFALO, NEW YORK, ASSIGNOR, BY MESNE ASSIGN-
MENTS, TO THE RELIANCE AIR BRAKE COMPANY, INC., OF BUFFALO, NEW
YORK, A CORPORATION OF DELAWARE.

FLUID-PRESSURE BRAKE.

1,357,692.     Specification of Letters Patent.     Patented Nov. 2, 1920.

Application filed February 11, 1918. Serial No. 216,437.

*To all whom it may concern:*

Be it known that I, FRANK HUTCHINSON DUKESMITH, a citizen of the United States, residing in Buffalo, in the county of Erie and State of New York, have invented new and useful Improvements in Fluid-Pressure Brakes, of which the following is a specification.

This invention relates to fluid pressure brakes of locomotive and other railway vehicles, and more particularly to a brake apparatus such as that shown in my Patent No. 1,278,317, dated September 10, 1918.

One object of my invention is to simplify certain parts of the apparatus, and to improve the operation in some respects.

Another object is to provide means for a separate exhaust outlet for the pressure which controls the movement of the relief piston in my independent brake valve, when the handle of that valve is in its "quick release" position, thereby permitting the pressure in the pipe leading to the relief piston in my independent brake valve to be exhausted just as quickly as that brake valve exhausts the pressure from the brake cylinder.

Another object of my improvements is to provide means in my independent brake valve for exhausting the pressure from the control chamber of my brake cylinder pressure control valve, which may be used in connection with my independent brake valve, thereby eliminating the relief valve shown in my aforesaid application for patent.

Another object of my invention is to provide means whereby the exhaust of the brake cylinder pressure is made by way of and through my independent brake valve, after either an independent or an automatic application of the locomotive brakes has been made. This eliminates the necessity of having to depend upon the operation of a distributing valve or triple valve mechanism when releasing the brakes on the locomotive, and insures the prompt release of the locomotive brakes under all circumstances, and besides, places the control of the exhaust of brake cylinder pressure in the hands of the engineer.

Another object of my invention is to provide a simple means in combination with any ordinary triple valve, whereby the locomotive brake cylinders can be supplied with fluid pressure without having to depend upon the closing or opening of the exhaust port from the brake cylinder by the automatic valve mechanism which works in conjunction with any ordinary triple valve or distributing valve mechanism.

Another object of my invention is to provide means whereby an ordinary triple valve in combination with the old style G—6 engineer's automatic brake valve can be used to cause fluid pressure to be automatically supplied to the brake cylinders on a locomotive in an amount proportionate to the reduction made upon the brake pipe pressure, without connecting said triple valve to the brake cylinders and without requiring the triple valve or the supply valve to close the exhaust port from the brake cylinders.

Another object of my invention is to provide an air brake system for locomotives which will permit of the brakes being applied and released while the automatic portion of the system is cut out and without the use of a double check valve in the brake cylinder pipe.

Another object of my invention is to provide a means whereby fluid pressure will be automatically maintained in the brake cylinders on a locomotive in response to the admission of fluid pressure from the brake cylinders to the control chamber of said means and without requiring said means to close the exhaust port from said brake cylinders.

Another object of my improvement is to provide a controllable means for regulating the length of time required to exhaust fluid pressure from the relief piston chamber of my independent brake valve.

In the accompanying drawings.

Similar characters of reference indicate corresponding parts throughout the several views.

Figure 1:
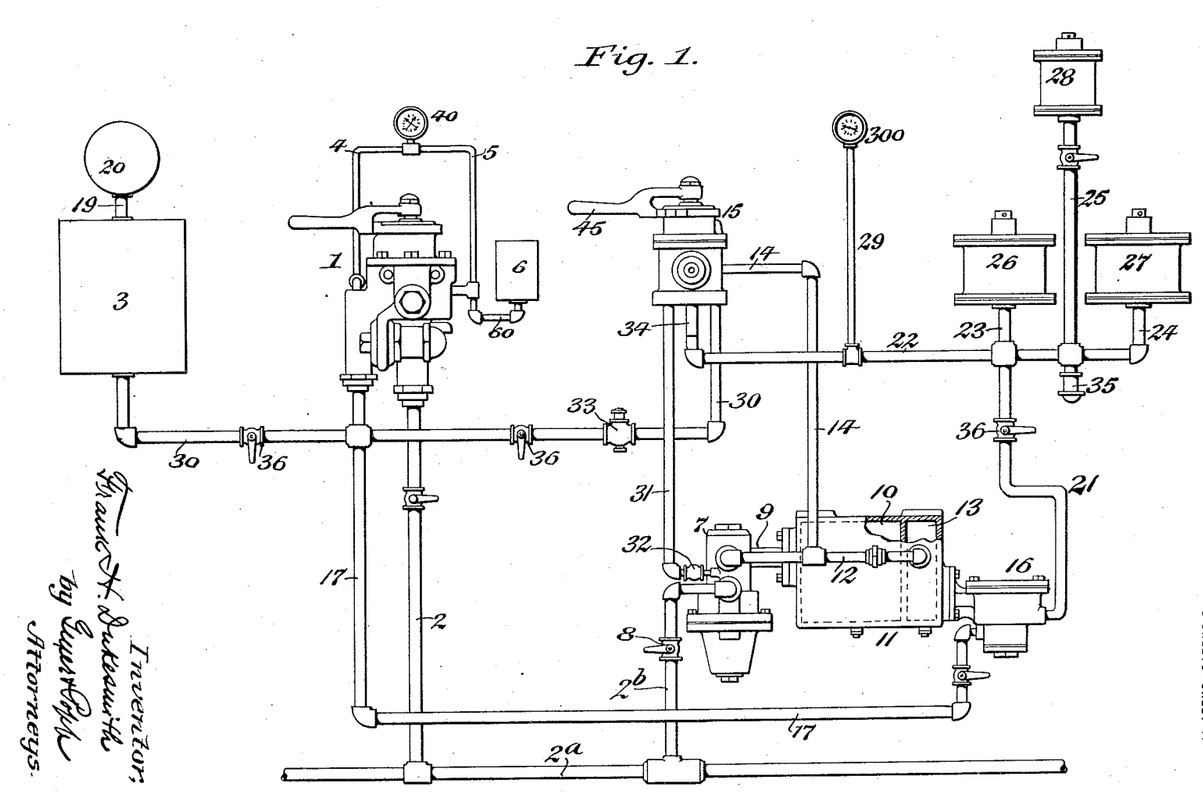
Figure 1 is a diagrammatic view of a locomotive brake system with the preferred form of my improvements applied thereto showing in outline how the old style G—6 brake valve and an ordinary plain triple valve is connected to my independent brake valve, brake cylinder control valve and its divided reservoir.

The apparatus illustrated in Fig. 1 of the drawings comprises a standard G—6 engineer's automatic brake valve mechanism 1 or any other standard type of automatic brake valve mechanism, such as has been in common use for many years, which valve mechanism is connected by train pipe 2 with the main train pipe $2^a$, by pipe 30 with the main reservoir 3, by gage pipes 4 and 5 with the gage 40, and by pipe 60 with the equalizing reservoir 6, in the usual way.

The plain triple valve mechanism 7 is connected by the branch pipe $2^b$ to the main train pipe $2^a$ and provided with a cutout cock 8. This triple valve is connected by pipe 9 with the pressure chamber 10 of the divided reservoir 11, and by pipe 12 to the control chamber 13 of the divided reservoir. Pipe 14 connects the pipe 12 with my independent brake valve mechanism 15. The control valve mechanism 16 is suitably bolted to the divided reservoir 11. Pipe 17 connects the control valve mechanism 16 with the main reservoir pipe 30 leading to the main reservoir 3 which is connected by pipe 19 to the air pump 20. Pipe 21 connects the control valve mechanism 16 with the brake cylinder pipe 22 which latter is in turn connected by branch pipes 23, 24 and 25 with the engine brake cylinders 26 and 27 and with the tender brake cylinder 28. The brake cylinder pipes are connected by a pipe 22 with my independent brake valve mechanism 15 and the pipe 22 is connected by a gage pipe 29 with the cylinder gage 300. The triple valve 7 is connected by pipe 31 with my independent brake valve mechanism 15, and in this pipe is arranged a check valve 32 between the exhaust port of the triple valve 7 and my independent brake valve mechanism 15. 33 is a pressure reducing valve of any ordinary construction located in the main reservoir pipe 30 leading from the main reservoir 3 to the independent brake valve mechanism 15. 34 is a pipe nipple extending from the brake cylinder exhaust port of my independent brake valve mechanism 15. 35 is a safety or blow-down valve of any standard type which may be located in the brake cylinder pipe 22 or other line communicating therewith. 36 are cut-out cocks of the usual type, located in the pipes 21 and 30.

Figure 2:
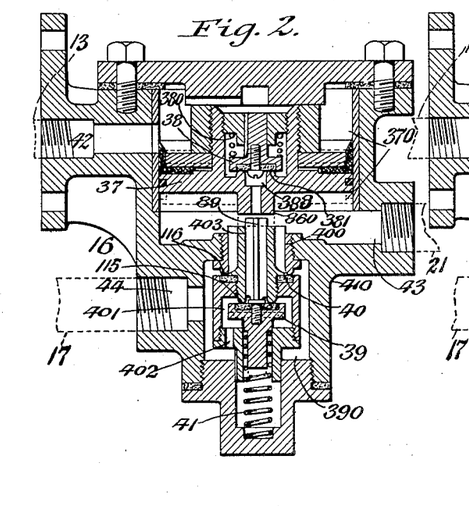
Fig. 2 is a sectional view of my brake cylinder pressure control valve mechanism shown in its normal position.
Figure 3:
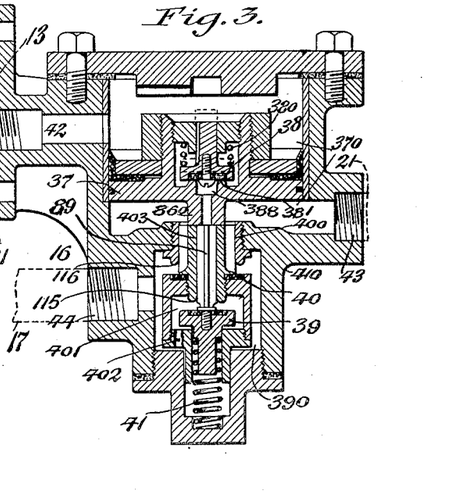
Fig. 3 is a sectional view of this control valve mechanism with the preliminary and main supply valve open.

The brake cylinder pressure control valve mechanism 16 shown in Figs. 1, 2 and 3 comprises a piston 37 reciprocating in a control cylinder 370 which contains a port 388 therethrough which is controlled by a check valve 38, the latter being yieldingly held against its seat 381 by a spring 380. The space in the cylinder 370 above the piston 37 communicates constantly with the pipe connection 42 which leads to the control chamber 13. The check valve 38 opens toward the pipe connection 42. The port 388 opens into the cylinder 370 below the piston 37 and when opened by the valve 38 places the spaces above and below this piston in communication with each other. The space in the cylinder 370 below the piston 37 is always in communication through connection 43 with the pipe 21 leading to the brake cylinders. Below the cylinder 370 is arranged a chamber 390 which communicates constantly by pipe connection 44 and pipe 17 with the piping of the main reservoir 3, and this chamber also is adapted to communicate with the lower end of the cylinder 370 by a port 400 in the body 410 of the valve mechanism. The port 400 is controlled by a main check supply valve 40 which opens toward the pipe connection 44 and it contains a chamber 401 which communicates at its lower end constantly by a passage 402 or the like with the chamber 390 while its upper end is provided with a port 403 which is adapted to place the same in communication with the lower end of the cylinder 370. Within the chamber 401 is arranged a preliminary supply check valve 39 which controls the port 403 and closes toward the cylinder 370. The valve 39 is yieldingly held against its seat 115 on the port 403 by a spring 41 and the latter also operates through the medium of the valve 39, against the valve 40 for holding the latter yieldingly against its seat 116 on the port 400.

The independent brake valve mechanism 15 (Fig. 9) which is embodied in my invention, comprises a body 457 having a rotary valve chamber 450 in its upper part which communicates constantly by a connection 456 (Fig. 8) with the main reservoir pipe 30. In its lower part the body 457 is provided with a main central exhaust passage 451 which is constantly open at its lower end to the atmosphere through the nipple 34 while its upper end is adapted to be placed in communication with and cut off from communication with the upper end of another passage 452 in the lower part of said body, this last mentioned passage being always in communication, preferably at its lower end with the brake cylinder pipe 22.

Figures 7, 8, 9, 10, 11, 12, 13, 14, 15:
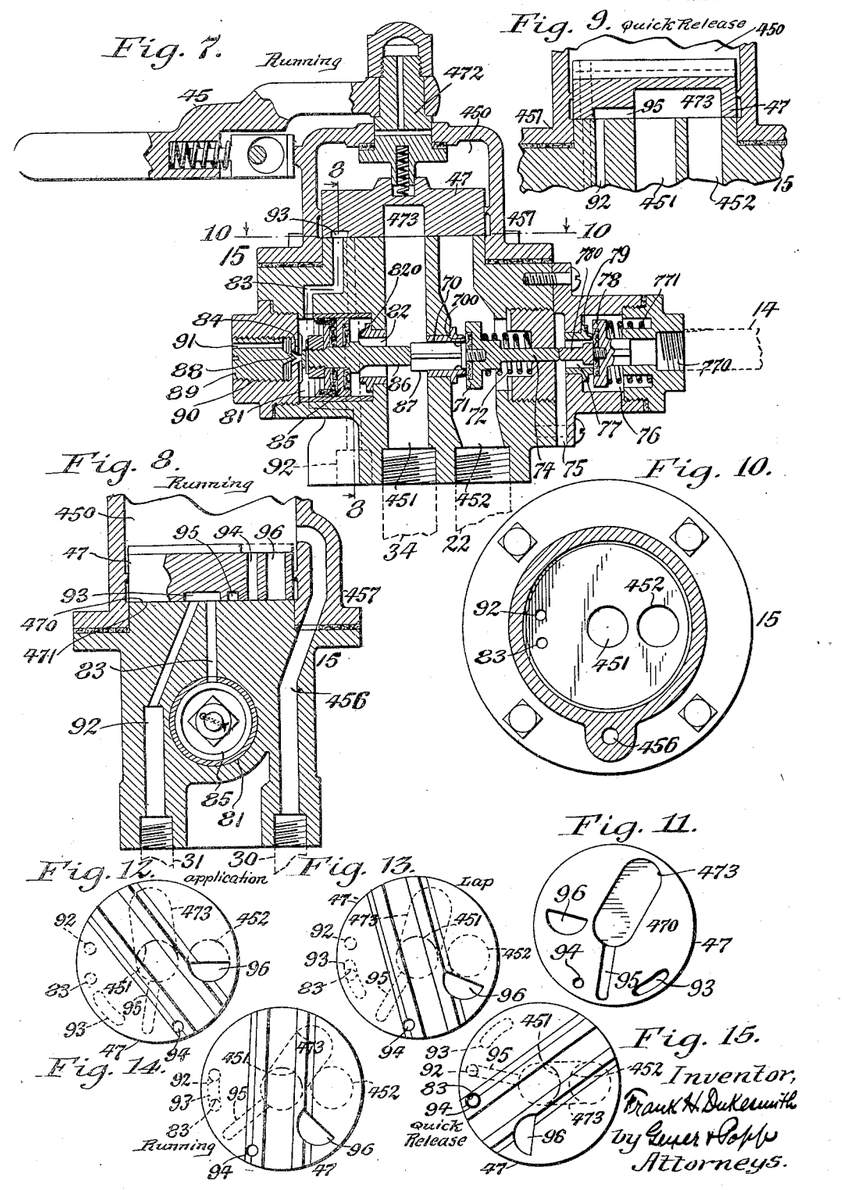
Fig. 7 is a sectional view of my independent brake valve mechanism in its normal or running position.
Fig. 8 is a sectional view of my independent brake valve mechanism in its normal release position, the section being taken in line 8—8, Fig. 7.
Fig. 9 is a fragmentary vertical section, similar to Fig. 7 but in its quick release position.
Fig. 10 is a horizontal section taken in line 10—10, Fig. 7.
Fig. 11 is a bottom plan view of the rotary valve of my independent brake valve mechanism.
Fig. 12 is a top plan view of the rotary valve with its face and seat in broken lines.
Figs. 13, 14 and 15 are similar views of the rotary valve on its seat in its various positions.

Within the chamber 450 is arranged a rotary valve 47 which engages its underside or face 470 (Fig. 8) with a valve seat 471 on the bottom of the chamber 450, this valve being provided with a stem 472 which is journaled in the top of the chamber 450 and turned by a handle 45 attached to the stem 472 outside of this chamber as best shown in Fig. 7. On its underside the rotary valve is provided with an exhaust cavity 473 (Fig. 11) which has its inner end constantly in communication with the main exhaust passage 451 while its outer end is adapted to register with the upper end of the brake cylinder passage 452, as shown in Fig. 9 or be out of register with this brake cylinder passage, as shown in Fig. 7 and thereby either connect or disconnect the passages 451, 452 by turning the valve 47 as desired.

Formed in the body 457 and leading from the passage 452 to the passage 451 is a port 70 which is controlled by a cylinder relief valve 71 closing toward the exhaust passage 451 against a seat 700 on the port 70, this valve being yieldingly held in its closed position by a spring 72, and provided with a stem 74 which projects into a control exhaust passage 75 opening to the atmosphere. 76 represents a valve chamber which communicates at its outer end constantly by a connection 770 and the pipes 14, 12, with the control chamber 13 while its inner end is connected by a port 77 with the exhaust passage 75. The port 77 is controlled by a control chamber relief valve 78 which is yieldingly held against a seat 79 on the port 77 by a spring 771 so that this valve when closing this port moves toward the exhaust passage 75. This valve has a stem 780 on its front side which engages with the stem 74 of the brake cylinder relief valve 71.

In the body 457 adjacent to the main exhaust passage 451 is arranged a relief cylinder 81 which has its inner end connected by an opening 82 with the main exhaust passage 451 while its outer end communicates with an inlet port 83 leading from the seat of the rotary valve, as shown in Figs. 7, 8 and 10, and this cylinder is also provided with an exhaust port 84 which is always open to the atmosphere by passage 91. Within the cylinder 81 is arranged a relief piston 85 which has a stem 86 projecting through the opening 82 and engaging a stem 87 on the front side of the brake cylinder relief valve 71. The exhaust port 84 is adapted to be regulated by a screw valve 88 which moves toward and from the outer side of this port and is mounted in a screw plug 89 which engages a threaded socket 90 on the body and is provided with a vent passage 91 which constantly maintains communication between the port 84 and the atmosphere. The inner side of the piston 85 is adapted to serve as a valve and engages a seat 820 at the inner end of the opening 82 for closing the same and preventing the escape of air through the cylinder 81 to the exhaust passage 451 in the event that the packing between the piston 85 and its cylinder 81 should become worn, defective or leaky.

92 is a relief passage arranged in the lower part of the body of the independent brake valve mechanism and connected at its lower end with the pipe 31 leading to the exhaust port of the triple valve while the upper end of this passage opens through the seat of the rotary valve 47 adjacent to the passage 83. The upper ends of the passages 83 and 92 are adapted to be connected and disconnected by the rotary valve which has a groove 93 in its face so that in one position of this valve, as shown in Figs. 8 and 14, these passages are connected, but when turning this valve so that this groove does not register with both of these passages at the same time, as shown by dotted lines in Figs. 12, 13 and 15, their communication between these two passages is cut off. 94 is a port extending through the rotary valve from its face to the top thereof, as best shown in Fig. 8. 95 is an exhaust groove formed in the face of the rotary valve and extending laterally from the exhaust cavity 473 and adapted to be moved into and out of register with the port 92 upon turning the rotary valve in one direction or the other. 96 is a brake cylinder supply port extending through the rotary valve from the face on its underside to the top thereof and adapted to be moved into and out of register with the upper end of the brake cylinder passage 452.

Although any well known triple valve mechanism may be used in connection with my invention, that shown in detail in Figs. 4, 5 and 6, as an example, is suitable and as there shown the same is constructed as follows:

100 is the body or casing of the triple valve provided at one end with a brake pipe chamber or cylinder 101 and at its other end with a reservoir chamber 102. The lower end of the chamber 101 is connected with the train pipe 2ᵇ and its upper end is provided with a feed groove 103. The reservoir chamber 102 is provided on one side with an outlet 104 which is always in communication through the pipe 9 with the pressure chamber 10, and on its opposite side this reservoir chamber is provided with a supply port 105 and a release port 106, the supply port 105 being connected by the pipe 12 with the control chamber 13 while the release port 106 is connected by the pipe 31 with the passage 92 of the independent brake valve mechanism.

107 is the triple valve piston reciprocating in the chamber 101 and provided with a stem 108 arranged in the reservoir chamber 102. 109 is a main or equalizing slide valve which reciprocates in the chamber 102 and is provided with a cavity 110 and a supply port 111 extending through the same. This valve is loosely connected with the stem of the triple valve piston so as to move with the latter part way, this connection being effected by shoulders 112, 113, arranged on the stem 108 and engaging with opposite ends of this slide valve. 114 represents a graduating valve which is mounted on the triple valve stem and controls one end of the through port 111.

The operation of this mechanism is as follows:

When the main reservoir 3 is charged in the usual manner and the engineer's automatic brake valve 1 is in its running or normal position, air flows into the train pipes 2, 2ª, and the branch pipe 2ᵇ through the triple valve 7 in the usual manner and also flows through the pipe 9 into the pressure chamber 10, until the air in this pressure chamber is equal to the air in the train pipe.

Figures 4, 5, 6:
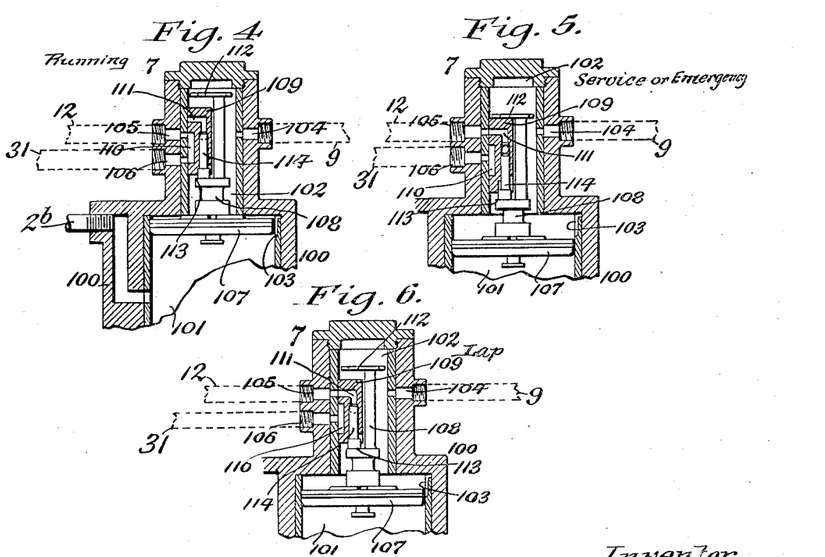
Fig. 4 is a sectional view of a plain triple valve in its normal position.
Fig. 5 is a sectional view of a plain triple valve in its service position.
Fig. 6 is a sectional view of a plain triple valve in its lap position.

To make an automatic service application of the brakes, the engineer's automatic brake valve 1 is turned to service application position in the usual manner, which will cause a reduction of train pipe pressure on the outer side of the triple valve piston 107, and move the latter to its service position, as shown in Fig. 5. In this position, air from the reservoir chamber 102 is free to pass through the supply port 111 in the slide valve 109, into pipe 12 and thence into control chamber 13 and through the passage 42 of the control valve mechanism 16 to the top of the control piston 37, thereby driving this piston down and causing its stem 860 to engage with the stem 89 of the preliminary supply valve 39, forcing the latter from its seat 115 which permits the pressure in the chamber 401 to pass out around the stem 89 into the lower end of the chamber 370 and through pipe connection 43 into brake cylinder pipe 21 to the brake cylinders 26, 27 and 28. The discharge of pressure from the chamber 401 being faster than it can flow into this chamber through port 402 momentarily reduces the force exerted on the underside of the main supply valve 40 and permits the piston 37 to also force the main supply valve 40 from its seat 116, as shown in Fig. 3, and permit the main reservoir pressure, which is always in chamber 390, to flow through passage 400 into the lower end of chamber 370 and by way of the pipe connection 43 into the pipe 21 leading to the brake cylinders 26, 27 and 28 on the engine and tender. When the triple valve 7 assumes its lap position, as shown in Fig. 6, it cuts off any further flow of air from pressure chamber 10 into the control chamber 13, and when the pressure from the main reservoir pipe 30 has built up the pressure in the lower end of the chamber 370 and in the brake cylinders on the engine and tender equal to or slightly in excess of the pressure that is above the control piston 37, this piston will cease to hold the supply valves 40 and 39 from their seats, which permits them to close and stop any further flow of air into the brake cylinders. Should a further reduction of pressure be made in the train pipe, the triple valve 7 will again move to its service position, as shown in Fig. 5, and again admit air from pressure chamber 10 into the control chamber 13 and above the control piston 37, causing it to again open the supply valves 39 and 40, and permit a further discharge of main reservoir pressure into the lower end of the chamber 370 and the brake cylinders on the locomotive and tender, until the pressure in the brake cylinders is equal to or sligthly in excess of the pressure on top of the control piston 37. By placing the handle 45 of the independent brake valve mechanism 15 in its running position, corresponding to the position shown in Fig. 14, and returning the handle of the engineer's automatic brake valve mechanism 1 to either its release or running position, which will cause the train pipe pressure to force the triple valve to its release position, as shown in Fig. 4, the movement of the triple valve thereby permits the air which was confined in the control chamber 13 and above the control piston 37 to flow through the exhaust cavity 110 in the slide valve of the triple valve 7 and through the check valve 32 and pipe 31, passage 92, groove 93, port 83 and into the chamber 81, forcing piston 85 forward, and causing its stem 86 to contact with stem 87 of check valve 71, thereby opening passage 70 to permit brake cylinder pressure to flow from passage 452 into the main exhaust passage 451. When the piston 85 moves forward to unseat the check valve 71, this action causes the stem 74 of this valve to contact with stem 780 of the check valve 78 and allow the control chamber pressure which has reached the inlet connection 770 by way of pipe 14 to exhaust through passage 77 and out through the control chamber exhaust channel 75 to the atmosphere, thereby relieving the pressure from the top of the control piston 37. The check valve 32 in the pipe 31 prevents any back flow of pressure through this pipe, and the restricted opening 84 prevents the full escape of pressure from chamber 81 until sufficient time has elapsed to permit of brake cylinder pressure being exhausted by way of the opening 70. When the pressure has been exhausted from chamber 81, springs 72 and 771 cause the check valves 71 and 78 to return to their seats and at the same time move piston 85 to its normal position, as shown in Fig. 7. Thus it will be seen that the exhaust of pressure from the brake cylinder on the engine and tender is entirely controlled by the independent brake valve mechanism 15 as there is no cylinder release valve in the brake cylinder pressure control valve mechanism 16.

When an independent application of the brakes of the locomotive is to be made, the handle 45 of the independent brake valve mechanism is placed in its application position corresponding to the position of the rotary valve in Fig. 12. Main reservoir pressure which is always on top of the rotary valve, will now pass through port 96 in the rotary valve and through passage 452 into the brake cylinder pipe 22 and into brake cylinders 26, 27 and 28, thereby applying the brakes. At the same time brake cylinder pressure passes by the way of pipe 21 to the lower end of the chamber 370 of the control valve mechanism through port 388 to the underside of check valve 38 in the control piston 37, causing this check valve to lift and admit brake cylinder pressure to the top side of piston 37 and by way of passage 42 to the control chamber 13. When the handle 45 of the independent brake valve mechanism is returned to its lap position, corresponding to the position of the rotary valve shown in Fig. 13, then if any pressure leaks from the brake cylinders, it would cause a corresponding reduction in the pressure in the lower end of the chamber 370 of the control valve mechanism and thereby cause the pressure on the top side of the piston 37 to move that piston down until its stem 860 opens the supply valves 39 and 40, admitting main reservoir pressure to the lower end of the chamber 370 and through pipe 21 to the brake cylinders on the engine and tender, which causes the pressure to be restored in the brake cylinders, in the same manner as though an automatic application of the brakes had been made. When the handle 45 of the independent brake valve mechanism is returned to running position corresponding to the position of the rotary valve in Fig. 14 and the triple valve is in its running position, as shown in Fig. 4, then the pressure in the pipe 31 will flow by way of port or passage 92, groove 93 and port 83 to the chamber 81 and cause relief piston 85 to move forward and unseat check valves 71 and 78, thereby permitting the pressure to be exhausted from the brake cylinders and from the control chamber 13 by way of the independent brake valve.

To make a quick release of the locomotive brakes after an independent or automatic application has been made, this is effected by placing the handle 45 of the independent brake valve mechanism 15 in its quick release position, corresponding to the position of the rotary valve shown in Fig. 15, which will bring one end of the cavity 473 directly over port 452, the other end of which is always in register with port 451 in the valve seat, thereby providing a large and direct opening from the brake cylinders to the atmosphere. At the same time one end of exhaust groove 95 registers with port 92 and permits the quick exhaust of the pressure in pipe 31, while at the same time reduced main reservoir pressure flows through the port 94 and through the port 83 into chamber 81 and causes the relief piston 85 to move forward and drive the stem 87 of check valve 71 against the stem 780 of check valve 78, and thereby empty the control chamber 13.

To make an emergency application of either the locomotive or train brakes, the handle of the automatic engineer's brake valve mechanism 1 is placed in its emergency position in the usual manner. The sudden reduction of train pipe pressure will cause the triple valve 7 to assume its full application position corresponding to Fig. 5, and thereby permit the air in the pressure chamber 10 to quickly equalize into the control chamber 13 and on top of control piston 37, which will cause it to open the supply valves 39, 40, as previously explained.

By reason of the fact that the main reservoir pipe 30 and the pipe 17 convey air from the main reservoir 3 to the brake cylinders 26, 27, 28 by way of the control valve 16, and pipe 30 conveys air from the main reservoir 3 to the brake cylinders by way of the independent brake valve mechanism 15, it follows that the automatic portion of this equipment can be cut out without preventing the locomotive brakes from being applied and released with the independent brake valve mechanism.

If it is desired to hold the engine and tender brakes applied at the time of releasing the brakes on the cars of the train the independent brake valve mechanism 15 is moved to lap position, corresponding to the position of the rotary valve in Fig. 13, so that port 92 is disconnected from port 83 and, therefore, the pressure that is in the relief pipe 31 is prevented from getting into relief piston chamber 81. When it is desired to release the locomotive brakes after the train brakes have been released, the movement of the handle 45 of the independent brake valve 15 into its running position, as shown in Fig. 14, will permit air from the relief pipe 31 to pass by way of port 92, groove 93 and port 83 into relief piston chamber 81 and cause piston 85 to move forward and unseat check valves 71 and 78, thereby causing the control pressure in chamber 13 to be instantly exhausted by way of passage 77 and exhaust passage 75, while brake cylinder pressure from passage 452 exhausts at its normal rate by way of passage 70 into the main exhaust passage 451. When all the pressure in chamber 81 has escaped by way of restricted passages 84, the relief piston 85 will then be moved back to its normal position and check valves 71 and 78 will be reseated by their return springs, as shown in Fig. 7.

After the train brakes have been released in the usual manner a graduated release of the locomotive brakes may be obtained by moving the handle 45 of the independent brake valve back and forth between lap and running positions, as shown in Figs. 13 and 14.

A graduated release of the locomotive brakes may be obtained while the train brakes are applied and while the engineer's automatic brake valve mechanism is in its lap position, by moving the handle of the independent brake valve mechanism back and forth between its quick release and running positions, or between quick release and lap position, for the reason that when the triple valve is in service lap position, as shown in Fig. 6, and no air is in the relief pipe 31, then when the handle of the independent brake valve mechanism is placed in its quick release position, it opens the brake cylinders on the locomotive to the atmosphere by way of ports 452 and 451 and the exhaust cavity 473 in the rotary valve, but when the handle of the independent brake valve mechanism is in either running or lap position, the exhaust cavity 473 is not in register with the brake cylinder port 452.

The engine and train brakes may be released simultaneously by leaving the independent brake valve mechanism in its running position while the engineer's automatic brake valve mechanism is moved to either its release or running position.

By means of the simplified and improved pipe connections between the main reservoir and the brake cylinder pressure control valve mechanism and the main reservoir and the independent brake valve mechanism, it will be readily seen that this system of locomotive air brakes reduces to a minimum the danger of losing entirely the control of the brakes on the locomotive, as by this system the automatic portion may be entirely inoperative without destroying the effectiveness of the independent straight air portion.

This system differs from all other types of alternate control air brake systems by reason of the fact that instead of requiring a specially constructed automatic brake valve and a new kind of triple valve mechanism, it makes use of any standard type of engineer's automatic brake valve and any standard plain or quick action triple valve, which working in combination with my new independent brake valve and very simple control valve mechanism, provides every functional action obtained by the most complicated and expensive air brake systems now in use, and, in addition, it provides the very important function of a quick release of the locomotive brakes when occasion demands.

The system embodies an automatic portion and an independent portion, so arranged that the automatic portion may be cut out, or become inoperative, without interfering with the operation of the independent portion. This insures against the danger of losing the use of the locomotive brakes in case the automatic portion should become defective.

Both the automatic and independent release of the brakes on the engine and tender is made by way of the independent brake valve, instead of through a triple valve or distributing valve. This unique feature enables the engineer to control the release of the brakes under all circumstances, and avoids the danger of an undesired release of the engine brakes, the occurrence of which frequently results in costly accidents.

The exhaust of pressure from the brake cylinders and from the control chamber of the control valve mechanism is made simultaneously through the independent brake valve. This feature enables an engineer to instantly stop the cylinder exhaust when desired, by simply placing the handle of the independent brake valve in lap position, regardless of whether or not the control chamber pressure has already been fully released. This means that a perfect graduated release of the brakes can be made under all conditions.

The pressure from the control chamber, the pressure reservoir and the brake cylinder can all be simultaneously exhausted through the independent brake valve while the triple valve is in full service or emergency position, if occasion demands, and thereby avoid the danger of an undesired re-application of the brakes before the application of the brakes is required.

Both the control chamber and the pressure reservoir, as well as the brake cylinders, can be re-charged by the independent brake valve while the triple valve is in its full service or emergency position, thereby making the brake system ready for an automatic application without having to charge the pressure reservoir by way of the train pipe. This feature gives the engineer absolute control of the engine brakes under all circumstances without endangering the perfect operation of the brake and without having to release the train brakes in order to re-charge the pressure reservoir after an emergency application of the brakes has been made.

Main reservoir pressure can be admitted to the brake cylinders either by way of the control valve mechanism or by the independent brake valve, thereby insuring against the danger of a total loss of the locomotive brakes in case the automatic portion should for any reason have to be cut out, or become inoperative, and the federal law does not permit a train to be hauled by an engine with its brakes cut out.

When an independent application of the brakes is made, the independent brake valve sends air to both sides of the piston in the control valve mechanism, thereby causing the control valve mechanism to maintain the brake cylinder pressure against leakage, just the same as though an automatic application is made, and it does this even though the triple valve is cut out, or inoperative.

The control valve mechanism may be cut out without having to cut out the triple valve or the triple valve may be cut out without interfering with the maintaining features of the control valve mechanism. This means that either the control valve or the triple valve, or both, may be cut out without interfering with the independent application and release of the locomotive brakes.

The quick release of the locomotive brakes is in no way dependent upon the operation of the control valve mechanism, and this feature insures against the danger of flattening or loosening of driving wheel tires or the dragging of brakes as the result of a defective triple valve or distributing valve.

A non-return check valve connected to the exhaust port of the triple valve enables a portion of the control chamber pressure to be trapped in the relief pipe leading to the relief piston chamber of the independent brake valve when the triple valve is in its release position, and this feature enables the normal release of the brakes to be regulated with absolute precision.

The pipe connection from the independent brake valve to the brake cylinders is direct, without any intervening valve mechanism such as a double-check valve, a triple valve or distributing valve, consequently, the engineer is enabled to make a prompt or graduated application of the locomotive brakes with absolute precision, and thus avoid all danger of shock to the cars in the train due to uncontrolled slack or improper action of the brake apparatus on the locomotive.

The independent brake valve not only controls the exhaust of brake cylinder pressure after either an independent or automatic application has been made, but it also enables the engineer to graduate the brakes off after any kind of an application, for the reason that this brake valve has two separate exhaust outlets into the main exhaust passage, and both of them are at all times under the direct control of the engineer.

Aside from performing all the functional actions obtainable with any other locomotive air brake system now in use, and the added functions peculiar to this system alone, the parts comprising this system have been so arranged that any individual part of the system can be got at and repaired without disturbing any other parts of the system. This feature is of the highest importance under present railroad conditions.

I claim as my invention:

1. An air brake system comprising means for supplying compressed air, a main reservoir for storing said compressed air, an engineer's automatic brake valve connected with said reservoir, a train pipe connected to said engineer's brake valve, a triple valve connected with said train pipe, a brake cylinder, a brake cylinder pressure control valve mechanism, and an independent brake valve mechanism, operatively associated with said reservoir, triple valve, brake cylinder and brake cylinder control valve mechanism, and so constructed that in one position of said parts the compressed air is retained in the elements of said system while in another position of said parts, the compressed air is permitted to exhaust simultaneously from the control chamber of said brake cylinder control valve mechanism and from said brake cylinder through said independent brake valve.

2. An air brake system comprising means for supplying compressed air, a reservoir for storing compressed air, an engineer's automatic brake valve connected with said reservoir, a triple valve, a train pipe, a brake cylinder control valve mechanism, a brake cylinder, and an independent brake valve mechanism having a direct connection with said brake cylinder and said brake cylinder pressure control valve mechanism and so organized that the exhaust from said brake cylinder is directly through said independent brake valve mechanism during both the automatic and independent release of the brakes.

3. An air brake system comprising means of supplying compressed air, a main reservoir for storing compressed air, a brake cylinder, an independent brake valve mechanism constructed to permit of a slow and a quick release of pressure from said brake cylinder, a control chamber connected with said independent brake valve mechanism, a triple valve connected with said control chamber and said independent brake valve, said triple valve having an exhaust outlet, and a check valve arranged in the exhaust outlet of said triple valve and so organized to permit fluid pressure to pass through the triple valve exhaust outlet to said independent brake valve but not in the opposite direction.

4. An air brake system comprising means for supplying compressed air, a main reservoir for storing said compressed air, an engineer's automatic brake valve connected with said reservoir, a train pipe, a triple valve connected with said train pipe, a brake cylinder, a control chamber, and an independent brake valve mechanism operatively associated with said reservoir, engineer's valve, triple valve, brake cylinder and control chamber and so constructed that in one position of said parts the compressed air is retained in the elements of said system while in another position of said parts the compressed air is permitted to exhaust simultaneously from said control chamber and from said brake cylinder through said independent brake valve.

5. An air brake system comprising means for supplying compressed air, a reservoir for storing the compressed air, an engineer's automatic brake valve connected with said reservoir, a brake cylinder, a control valve mechanism, and an independent brake valve mechanism having a direct connection with said brake cylinder and said control valve mechanism, and so organized that the exhaust from said brake cylinder is directly through said independent brake valve mechanism during both the automatic and independent release of the brakes.

6. An air brake system comprising means for supplying compressed air, a main reservoir for storing compressed air, an engineer's automatic brake valve connected with said reservoir, a brake cylinder, an independent brake valve mechanism constructed to permit of a slow and a quick release of pressure from said brake cylinder, a control chamber connected with said independent brake valve mechanism, a triple valve connected with said control chamber and independent brake valve and said triple valve having an exhaust outlet, and a check valve arranged in the exhaust outlet of said triple valve and constructed to permit fluid pressure to pass through the triple valve from said control chamber to said independent brake valve but not in the opposite direction.

7. An air brake system comprising means for supplying compressed air, a main reservoir for storing compressed air, an engineer's automatic brake valve connected with said reservoir, a triple valve connected with said engineer's automatic brake valve, an independent brake valve, a pressure reservoir communicating directly with said triple valve and a control chamber connected with said independent brake valve and triple valve, said elements being so organized that when said triple valve is in its full service position or emergency position the fluid pressure from the pressure reservoir and the control chamber will be exhausted simultaneously through said independent brake valve.

8. An air brake system comprising means for supplying compressed air, a main reservoir for storing compressed air, an engineer's automatic brake valve connected with said reservoir, a triple valve connected with said engineer's automatic brake valve, an independent brake valve, a pressure reservoir communicating directly with said triple valve, a control chamber connected with said independent brake valve and triple valve, a brake cylinder connected with said independent brake valve and said control chamber, said elements being so organized that when said triple valve is in its full service position or emergency position the fluid pressure from the pressure reservoir, said control chamber, and said brake cylinder may be exhausted simultaneously through said independent brake valve.

9. An air brake system comprising means for supplying compressed air, a main reservoir for storing compressed air, an engineer's automatic brake valve connected with said reservoir, a triple valve connected with said engineer's automatic brake valve, an independent brake valve, a pressure reservoir communicating directly with said triple valve, and a control chamber connected with said independent brake valve and triple valve, said elements being so organized that when said triple valve is in its full service position or emergency position the fluid pressure from the pressure reservoir and the control chamber will be exhausted simultaneously through said independent brake valve and said control chamber and pressure reservoir may be recharged with fluid pressure directly through said independent brake valve when the latter is placed in its application position.

10. An air brake system comprising means for supplying compressed air, a main reservoir for storing the compressed air, an engineer's automatic brake valve connected with said reservoir, an independent brake valve connected with said reservoir, a triple valve connected with said engineer's valve, a brake cylinder connected with said independent valve, a control chamber connected with said independent valve, a pressure reservoir communicating with said triple valve, and a control valve mechanism connected with said main reservoir, brake cylinder and control chamber, and operating to permit fluid pressure to pass from said main reservoir to said brake cylinder either through said control valve mechanism or through said independent brake valve, and also operating to permit the exhaust of pressure from said brake cylinder only through said independent brake valve and preventing the exhaust of pressure from said brake cylinder from passing through said control valve mechanism to the atmosphere.

11. An air brake mechanism comprising means for supplying compressed air, a main reservoir for storing the compressed air, an independent brake valve connected with said main reservoir, a brake cylinder connected with said independent brake valve, a control chamber, said independent brake valve having a relief check valve which controls the exhaust from said control chamber, and a control valve mechanism associated with said control chamber and adapted to permit fluid pressure to pass from said main reservoir to said brake cylinder, said control valve mechanism having a piston exposed to the fluid pressure in said control chamber and a check valve in said piston which closes in a direction away from said control chamber.

12. An air brake system comprising means for supplying compressed air, a main reservoir for storing the compressed air, an engineer's automatic brake valve connected with said main reservoir, a brake cylinder, a control chamber, a control valve mechanism having a piston, and an independent brake valve mechanism operating to permit main reservoir pressure to bear against opposite sides of said piston, said piston containing a check valve which permits passage of fluid pressure toward said control chamber but prevents passage of fluid pressure in the opposite direction.

13. An air brake system comprising means for supplying compressed air, a main reservoir for storing the compressed air, an engineer's automatic brake valve connected with said main reservoir, a triple valve connected with said engineer's valve, a brake cylinder, a control valve mechanism constructed to permit fluid pressure to pass from said main reservoir to said brake cylinder, but which does not exhaust the pressure from said brake cylinder, a control chamber associated with said control valve mechanism, and an independent brake valve mechanism associated with said engineer's automatic brake valve, and provided with a relief check valve for controlling the exhaust of the fluid pressure from said control chamber and so organized that this relief valve will be opened upon moving said independent brake valve into either its running or quick release positions but remains closed in either its lap or application positions.

14. An air brake system comprising means for supplying compressed air, a reservoir for storing the compressed air, an engineer's automatic brake valve connected with said main reservoir, an independent brake valve connected with said main reservoir, a triple valve connected with said engineer's automatic brake valve and said independent brake valve, a brake cylinder connected with said independent brake valve, a control valve mechanism having a direct connection with said main reservoir, brake cylinder and independent brake valve and so organized that fluid pressure from said main reservoir may pass through said control valve mechanism to said brake cylinder regardless of whether said triple valve is cut into operation or cut out of operation.

15. An air brake system comprising means for supplying compressed air, a reservoir for storing the compressed air, an engineer's automatic brake valve connected with said main reservoir, an independent brake valve connected with said main reservoir, a triple valve connected with said engineer's automatic brake valve and said independent brake valve, a brake cylinder connected with said independent brake valve, a control valve mechanism having a direct connection with said main reservoir brake cylinder and independent brake valve and so organized that fluid pressure from said main reservoir may pass through said control valve mechanism to said brake cylinder regardless of whether said triple valve is cut into operation or cut out of operation, said control valve mechanism comprising a control cylinder having one end connected with a fluid pressure source while its other end is connected with the brake cylinder, a piston which is arranged in said control cylinder and the movement of which does not affect the release of pressure from said brake cylinder, a control valve mechanism connected with said main reservoir and having a supply port leading to the brake cylinder, and a supply check valve controlling said supply port and arranged to be opened by the movement of said control piston toward said supply port and admit fluid pressure from said main reservoir into said brake cylinder.

16. An air brake system comprising an independent brake valve mechanism having a pressure relief chamber provided with a relief port leading to the atmosphere, and a regulating screw for controlling said relief port.

17. An air brake system comprising a brake cylinder, a triple valve and an independent brake valve mechanism provided with a valve chamber containing a valve seat into which opens a main exhaust port, a large outlet passage connected with said brake cylinder and a small outlet passage connected with said triple valve, and a main valve arranged in said valve chamber and engaging with said seat and provided in its face with a large cavity adapted to connect said main exhaust port and large outlet passage and also a small outlet groove adapted to connect said exhaust port with said small outlet passage.

18. An air brake system comprising a brake cylinder, a triple valve, and an independent brake valve mechanism provided with a valve chamber containing a valve seat into which opens a main exhaust port, a large outlet passage connected with said brake cylinder and a small outlet passage connected with said triple valve, and a main valve arranged in said valve chamber and engaging with said seat and provided in its face with a large cavity adapted to connect said main exhaust port and large outlet passage and also a small outlet groove adapted to connect said exhaust port with said small outlet passage, said independent brake valve mechanism being also provided with a relief chamber a relief passage leading to said valve seat, a relief piston arranged in the relief chamber, a relief port extending from said large outlet passage to the main exhaust port, a relief valve or regulating screw controlling said relief port and actuated by said piston, and said main valve being provided with a through port adapted to register with said relief passage and permit fluid pressure to pass from said valve chamber into said relief chamber for causing the relief piston to open the relief valve at the same time that the main exhaust port is connected by the main valve with said large and small outlet passages.

19. An air brake system comprising means for supplying compressed air, a main reservoir for storing compressed air, a triple valve, a brake cylinder, a control mechanism, and an independent brake valve mechanism associated with said main reservoir, brake cylinder, triple valve and control mechanism and comprising a body containing a main exhaust port, a main valve chamber which connects with the main reservoir, a main outlet passage connected with the brake cylinder, a main relief port extending from said main supply and outlet passage to said main exhaust port, an auxiliary relief passage containing an auxiliary relief port leading to the atmosphere and connected with said triple valve and control mechanism, an auxiliary exhaust passage connected with said triple valve, a relief chamber having an inlet port and an outlet to the atmosphere, a main valve arranged in the main valve chamber and controlling communication between said main outlet passage and main exhaust port, between said main valve chamber and the inlet port of said relief chamber, between said main valve chamber and said main supply and outlet passage, between said auxiliary relief port and the inlet of said relief chamber, and between said main exhaust port and the inlet of said relief chamber, a main relief valve controlling the relief port between said main exhaust port and said main supply and outlet passage, an auxiliary relief valve controlling the auxiliary relief port and adapted to be opened by the movement of the main relief valve and a relief piston arranged in the relief chamber and adapted to open said main and auxiliary relief valves.

20. An air brake system comprising means for supplying compressed air, means for storing compressed air, an independent brake valve mechanism connected with said main reservoir, a brake cylinder connected with said independent brake valve mechanism, a triple valve connected with said independent brake valve mechanism, and a control valve mechanism comprising a body, having a control cylinder one end of which is connected with a fluid pressure source while its other end is connected with said brake cylinder, and a valve chamber which connects constantly with the main reservoir and has an outlet port leading to the brake cylinder, a control piston arranged in said control cylinder and containing a supply port, a check valve mounted on said piston and controlling the port therein and closing toward said brake cylinder, and a control valve arranged in said valve chamber and controlling said outlet port and opened by motion of said piston toward said brake cylinder.

21. An air brake system comprising means for supplying fluid pressure, a main reservoir for storing said fluid pressure, an engineer's automatic brake valve, an independent brake valve, a triple valve, a brake cylinder control valve mechanism, a pressure chamber connected with said triple valve and a control chamber connected with said control valve mechanism, said system being so organized that the exhaust of fluid pressure from said brake cylinder is by way of and through said independent brake valve mechanism, and said control valve mechanism being devoid of an exhaust outlet from said brake cylinder.

22. An air brake system comprising means for supplying compressed air, a main reservoir for storing said compressed air, an independent brake valve, a brake cylinder, a brake cylinder control valve mechanism and a control chamber associated with said control valve mechanism, said control valve mechanism including a control cylinder, a piston movable in said control cylinder, an inlet valve for supplying main reservoir air pressure to said control cylinder below said piston, and a supply valve for controlling the supply of air pressure from said brake cylinder to said control chamber and to said control cylinder, above said piston and operatively associated with the latter.

FRANK H. DUKESMITH.

It is hereby certified that the assignee in Letters Patent No. 1,357,692, granted November 2, 1920, upon the application of Frank H. Dukesmith, of Buffalo, New York, for an improvement in "Fluid-Pressure Brakes," was erroneously described and specified as "The Reliance Air Brake Company, Inc.," whereas said assignee should have been described and specified as *The Reliance Air Brake Corporation*, as shown by the records of assignments in this office; and that the said Letters Patent should be read with this correction therein that the same may conform to the record of the case in the Patent Office.

Signed and sealed this 21st day of December, A. D., 1920.

[SEAL.]

L. B. MANN,

*Acting Commissioner of Patents.*

Cl. 303—7.